(12) United States Patent
Yamakado et al.

(10) Patent No.: US 8,078,381 B2
(45) Date of Patent: Dec. 13, 2011

(54) VEHICLE SPEED CONTROL APPARATUS IN ACCORDANCE WITH CURVATURE OF VEHICLE TRAJECTORY

(75) Inventors: Makoto Yamakado, Tsuchiura (JP); Atsushi Yokoyama, Tokyo (JP); Masato Abe, Machida (JP)

(73) Assignee: Hitachi, Ltd., Tokyo (JP)

(*) Notice: Subject to any disclaimer, the term of this patent is extended or adjusted under 35 U.S.C. 154(b) by 875 days.

(21) Appl. No.: 12/124,770

(22) Filed: May 21, 2008

(65) Prior Publication Data

US 2008/0294321 A1 Nov. 27, 2008

(30) Foreign Application Priority Data

May 22, 2007 (JP) ................................. 2007-134885

(51) Int. Cl.
*B60W 10/04* (2006.01)
(52) U.S. Cl. .......................................... 701/93; 180/179
(58) Field of Classification Search .................. 701/36, 701/41–43, 91–96, 300–302, 65; 180/167–179; 342/104–113
See application file for complete search history.

(56) References Cited

U.S. PATENT DOCUMENTS

| | | | |
|---|---|---|---|
| 6,076,622 A | 6/2000 | Chakraborty et al. | |
| 6,408,241 B1 | 6/2002 | Sielagoski et al. | |
| 6,873,899 B2 * | 3/2005 | Sawamoto | 701/96 |
| 6,968,266 B2 * | 11/2005 | Ahmed-Zaid et al. | 701/96 |

FOREIGN PATENT DOCUMENTS

| | | |
|---|---|---|
| DE | 102 55 724 A1 | 12/2003 |
| EP | 0 901 929 A1 | 3/1999 |
| EP | 0 983 894 A2 | 3/2000 |
| EP | 1 426 230 A2 | 6/2004 |
| EP | 1 674 322 A1 | 6/2006 |
| EP | 1 693 242 A2 | 8/2006 |
| JP | 2004017731 A | 1/2004 |
| JP | 2004-224093 A | 8/2004 |
| JP | 2006-244284 A | 9/2006 |
| JP | 2007-290650 A | 11/2007 |

OTHER PUBLICATIONS

European Search Report dated Dec. 4, 2009 (six (6) pages).
"Curve and Curved surface for Deep Learning,—Elementary Study of Differential Geometry", pp. 48-51.
Makoto Yamakado et al., "Understanding and Evaluation of Driver and Vehicle Dynamic Characteristics based upon Jerk Information—An Investigation of Longitudinal and Lateral Integrated Control", 51-20075258, No. 11-07, pp. 13-18 including abstract.

* cited by examiner

*Primary Examiner* — Richard M. Camby
(74) *Attorney, Agent, or Firm* — Crowell & Moring LLP

(57) ABSTRACT

In order to fit a driver's driving feeling, a vehicle speed control system includes a unit that calculates the instantaneous curvature and a unit that controls vehicle speed. The system reduces the vehicle speed when the instantaneous curvature tends to increase, and enhances it when the instantaneous curvature tends to decrease.

9 Claims, 9 Drawing Sheets

VEHICLE SPEED CONTROL APPARATUS IN ACCORDANCE WITH CURVATURE OF VEHICLE TRAJECTORY

FIELD OF THE INVENTION

The present invention relates to a system for controlling a vehicle speed in accordance with the curvature of a vehicle trajectory.

DESCRIPTION OF RELATED ART

As a conventional technique, JP-A-2006-244284 discloses to have an object to provide a vehicle speed controller that can set a turning speed depending on a driver's taste and to have a structure that the vehicle speed controller includes: road curvature information detecting means for detecting the curvature or the radius of curvature of a road; corner detecting means for detecting the presence of a corner in front of a vehicle on the basis of the curvature or the radius of curvature of the road detected by the road curvature information detecting means; turning speed calculating means for calculating a recommended turning speed in the corner on the basis of the curvature or the radius of curvature of the corner in front of the vehicle, the presence of which is detected by the corner detecting means, and a recommended lateral acceleration corresponding to the curvature or the radius of curvature; target deceleration calculating means for calculating a target deceleration on the basis of the current vehicle speed, the recommended turning speed, and the distance to the corner; deceleration control means for controlling to decelerate the vehicle on the basis of the target deceleration calculated by the target deceleration calculating means; and lateral turning acceleration learning means for correcting the recommended lateral acceleration in accordance with an acceleration/deceleration operation when a driver's acceleration/deceleration operation is sensed during deceleration control of the deceleration control means.

In JP-A-2006-244284, the vehicle speed is reduced by the corner detecting means for detecting the presence of the corner in front of the vehicle on the basis of the curvature or the radius of curvature of the road detected by the road curvature information detecting means, and when the driver inputs a correction, the vehicle speed is corrected in response to the correction input. However, the information is only design information on the road. Since the running trajectory has a degree of freedom depending on a road width, the trace in which the vehicle actually travels is not completely equal to the information. For example, the road curvature information cannot be acquired when the vehicle turns left and right at a crossing. JP-A-2006-244284 only discloses the concept that "if there is a corner in front of the vehicle the vehicle is previously decelerated", but does not disclose a guideline about how to control the vehicle speed so as to meet a driver's feeling with a variation in curvature observed by an actual running vehicle.

BRIEF SUMMARY OF THE INVENTION

An object of the invention is to provide a vehicle speed control system that can vary a vehicle speed so as to meet a driver's feeling on the basis of instantaneous curvature.

Figure 1:
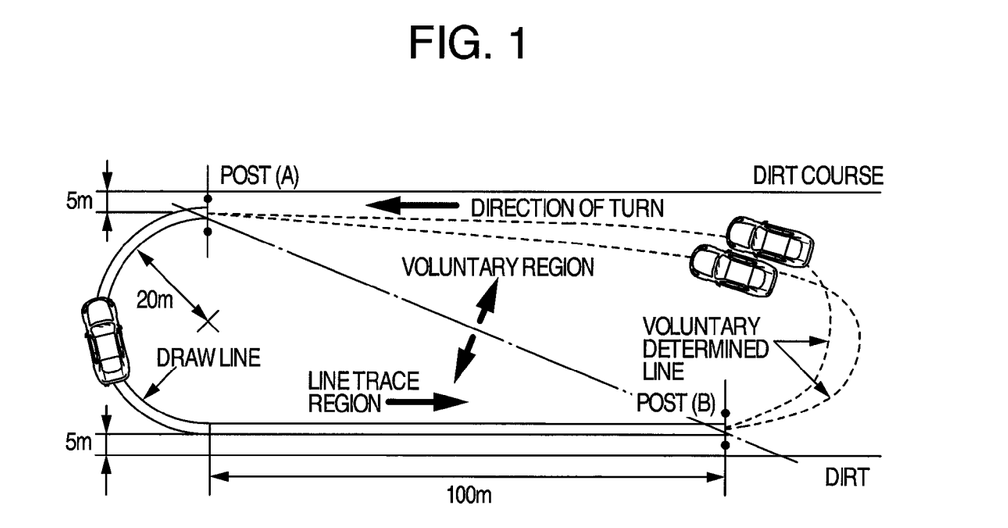
FIG. 1 is a diagram illustrating a test for examining a driver characteristic.

The inventors carried out the actual vehicle running test to acquire a guideline for controlling a vehicle speed in a curved road so as to meet a driver's feeling, as follows:

The actual vehicle running test is turning around test in which a strict line trace task assuming that a vehicle travels on a narrow road and a voluntary driving being capable of voluntarily selecting a path in a wide road with a high degree of freedom in lateral movement are performed alternately. FIG. 1 is a schematic diagram illustrating the test.

A driver drives a vehicle on a track counterclockwise. The driver drives the vehicle on a circular circumference having a radius of 20 m, which is drawn on a road, along a semicircle from post (A) and then drives on a straight line extending to post (B). As a reference of speed (which is not strict order for the driver), the driver decelerates the vehicle at a voluntary timing from about 60 km/h and then applies the accelerator at arbitrary timing during turning. Although a line is not drawn in the straight-line portion, as indicated in the drawing, dirt is placed outward apart by 5 m from the straight line and the vehicle is bound to run along the straight line. In this way, no instruction other than the approximate reference speed and the line trace is given, which is a task in which only the degree of freedom (voluntarism) in lateral movement is restricted.

On the other hand, the turning around test was carried out, in which the vehicle was decelerated from about 60 km/h and goes into post (B), and then, the vehicle reached post (A) again along a voluntarily selected path and returned to the line trace again. The range from post (A) to post (B) corresponds to a restricted voluntary driving (acceleration and deceleration are voluntary) in which the lateral movement is restricted to the line trace and the range from post (B) to post (A) corresponds to a totally voluntary driving (acceleration, deceleration, and lateral movement are all voluntary). The test was carried out by five young drivers with ages of 23 to 25.

The test vehicle is mounted with a global positioning system (GPS). A coordinate (position) at a time t in Expression (1) can be obtained from the GPS.

$$C(t)=C(x(t),y(t)) \quad (1)$$

Figure 2:
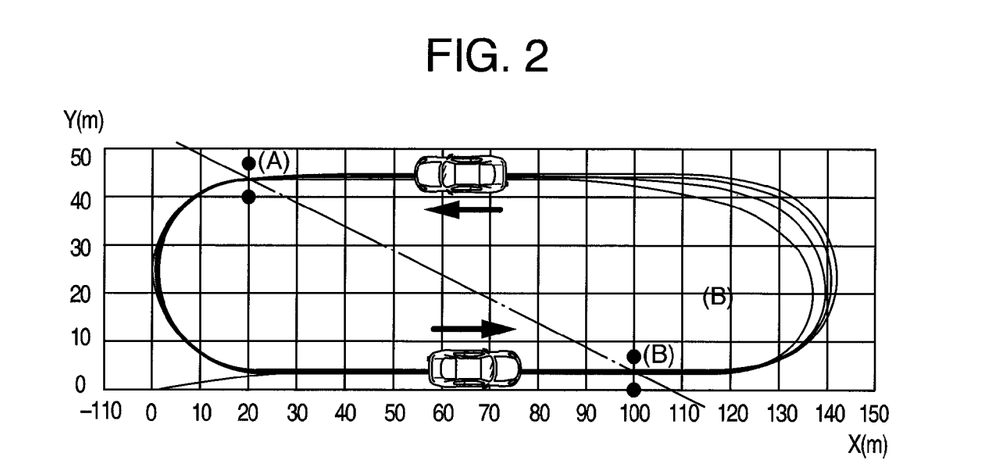
FIG. 2 is a diagram illustrating a trajectory of a test vehicle.

FIG. 2 shows a trajectory of a vehicle center of gravity measured by the GPS. It can be seen that the semicircle is accurately traced in the line trace section.

From now on, the curvature is discussed. Here, the curvature κ(t) expressed by a general parameter (time t in this time), not by an arc length parameter which indicates a distance along the path, can be obtained as Expression (2), which is described on pages 48 to 51 in "Curve and Curved Surface for Deep Learning,—Elementary study of Differential Geometry—", written by Nobumitsu NAKAUCHI and published by KYORITSU SHUPPAN CO., LTD. (2005).

$$\kappa(t) = \frac{\dot{x}(t)\ddot{y}(t) - \ddot{x}(t)\dot{y}(t)}{(\dot{x}(t)^2 + \dot{y}(t)^2)^{\frac{3}{2}}} \quad (2)$$

Figure 3A:
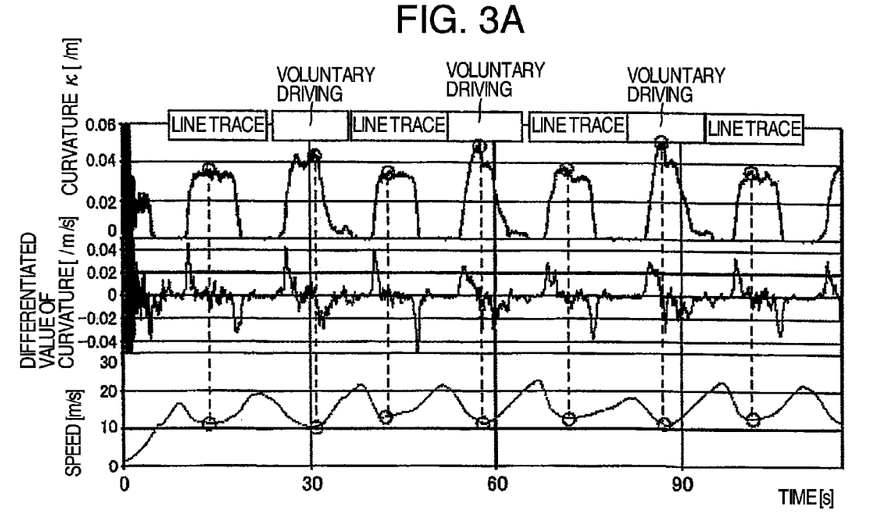
FIG. 3A is a diagram illustrating the curvature, the variation in curvature, and the speed variation of driver (a).
Figure 3B:
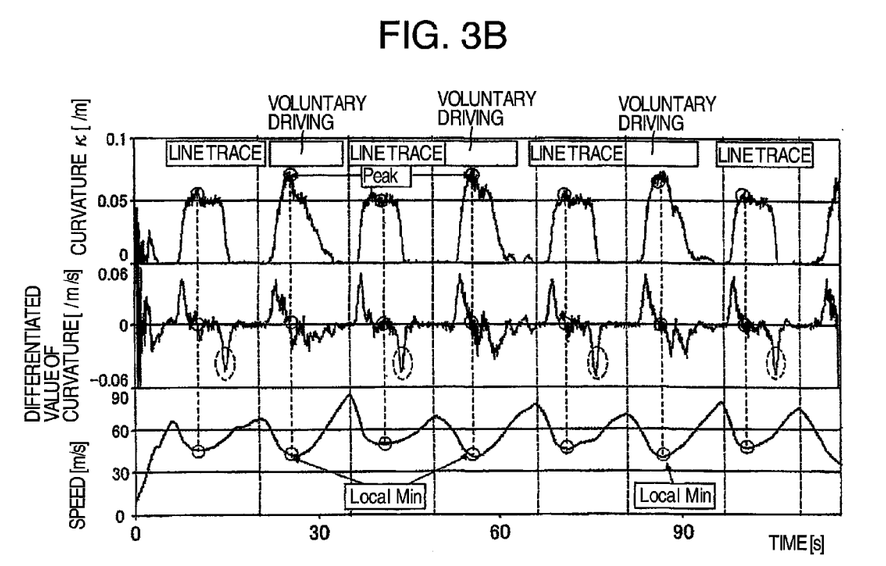
FIG. 3B is a diagram illustrating the curvature, the variation in curvature, and the speed variation of driver (b).

FIGS. 3A and 3B are diagrams illustrating the information of curvature, the time rate of variation in curvature, the vehicle speed in data of two drivers (drivers (a) and (b)) acquired from the above-mentioned test (120 second continuous turning around test). Since the data of the other drivers show the same tendency, only the data of two drivers are disclosed here.

It can be seen that the curvature which is the reciprocal of the rotation radius is almost constant in 0.05 m$^{-1}$ in the line trace section and then a line is traced. In the course in which the line trace is set, there is no relaxation curve and there is a great time rate of variation in curvature at the time of running from the straight line to the arc or from the arc to the straight line.

On the other hand, the voluntary driving course has the maximum value of curvature greater than the line trace and is sharper in trajectory than the line trace. However, it can be seen that the time rate of variation thereof is equal to or smaller than that of the line trace (particularly, on the escape side, it is remarkable). The reason is that the driver voluntarily adjusts the vehicle speed to execute the "time-based relaxation" so as not to cause a large time rate of variation in curvature even when the curvature as the shape of the path increases.

The vehicle speed at the lower parts of FIGS. 3A and 3B directly relating to the invention shows a feature that it is the minimum at a time when the curvature is the maximum (where the curvature is the local maximum point and the vehicle speed is a local minimum).

The maximum value of the curvature appears relatively early (the maximum does not correspond to the center of the duration). Since the path is curved, the reason for the short time for reaching the maximum value is that since the integrated value of the curvature is the curved angle of the path, it is intended to early capture post (A) (see FIG. 1) as the next target in the field of vision, or that it is intended to straight accelerating the vehicle, that is, to give priority to the traction force by early finishing the curved course using a tire cornering force. In the test, the missions that the movements between two points from (A) to (B) and from (B) to (A) and a variation in yaw angle is 180 degree are the same. In the line trace of the missions, the degree of freedom in path is restricted to determine the task. On the other hand, in the voluntary driving, the driver voluntarily plans and executes a task from the point of view of "Integrated vehicle motion" including the concept of time such as a speed and an acceleration (jerk) as well as path. It is thought that there exists a mechanism for making and executing an easily executable motion plan which is advantageous in dynamics and which can reduce a physical stress or which is suitable for improvement in control performance.

When the above-mentioned knowledge is applied to the speed control of a road traveling paying attention of the invention, the following (1) and (2) could be extracted as a portion relating directly to the invention.

(1) A driver changes a vehicle path depending on the road width. Accordingly, the curvature varies in a designed road shape and an actual running trajectory.

(2) The vehicle speed is controlled to be the minimum at a point where the curvature as the movement result of a driver's steering operation is the maximum.

Therefore, in order to provide a vehicle speed control system fitting a driver's feeling, which is an object of the invention, the vehicle speed control system includes means for instantaneously detecting a coordinate (X(t), Y(t)) of a vehicle (for example, using the GPS), means for calculating the instantaneous curvature from the detected instantaneous coordinate information of the vehicle, and means for controlling a vehicle speed, and controls to reduce the vehicle speed when the instantaneous curvature tends to increase and to increase the vehicle speed when the instantaneous curvature tends to decrease.

Since the above-mentioned knowledge is a guideline for a relative change in speed, it is necessary to regard to the driver's intention for the absolute speed. Accordingly, the invention includes means for accepting an acceleration/deceleration command input by the driver and is configured to vary the vehicle speed in accordance with the acceleration/deceleration command.

On the other hand, in the configuration for receiving the driver's acceleration/deceleration command, the driver's acceleration/deceleration command may interfere with a control command from a system. Even if the interference does not occur but the driver has an unpleasant feeling, the evaluation of the system may become bad. In a man-machine system in which a sharing percentage of the system and the driver is not clearly distinguished, this is an important problem. Accordingly, the invention intends to reduce the interference and the unpleasant feeling on the basis of the following thought.

The vehicle speed is basically controlled to meet a human feeling. This should be transmitted to the driver, and the driver is allowed to adjust an insufficient portion when the control is not sufficient.

In order to transmit the driver that the system is in operation, a reactive force or a pedal stroke at an input device (such as an accelerator or a brake pedal) to which the driver inputs a command is controlled as well as the speed. Ideally, a pedaling force resulting only from the driver placing his foot on an accelerator pedal is controlled to determine a pedal position for carrying out the control command from the system. In this state, when the speed control of the system meets the driver's request, the driver can recognize that the vehicle guesses and executes the driver's intention before giving a force to the foot for the pedaling operation. Accordingly, in comparison with the control in which the reactive force is not applied or the stroke is not returned, it is possible to accomplish the harmony between the driver and the system at a high level.

When the speed control of the system is not sufficient, the driver performs a correcting operation. Accordingly, the correction is stored and accumulated and a target nominal time history profile of the speed control is updated. For example, when the control system decelerates the vehicle and the situation of the driver's braking action is observed plural times, it is observed that the driver tends to perform the turning at a lower speed (the small centrifugal force is preferred) and it is controlled to enhance the degree of deceleration. Alternatively, when the driver accelerates the vehicle while the system decelerating the vehicle, and then decelerates the vehicle by a large deceleration, the braking profile is corrected so that the decreasing rate of the speed becomes greater, thereby accomplishing the harmony between the driver and the system with a higher level.

When the road surface condition is changed due to the weather such as rain or snow and the speed control is performed with the same condition as a clean weather and a dried road surface, the driver feels unpleasant. In this case, when it is determined that the frictional coefficient of the road surface decreases as the estimation result of the road surface state based on a wiper switch, a raindrop sensor, external information, a temperature, and the like, the average speed is reduced and the increasing or decreasing rate of the speed per unit time is controlled to be smaller to prevent the rapid change in motion of the vehicle due to the shift of tire vertical load, thereby accomplishing the harmony between the driver and the system with a higher level.

When an obstacle in front of the vehicle is recognized by using external information such as radar information or beacons obtained from infrastructures of the road to the system, the driver expects to reduce the speed, of course. In this case, even in the state where the instantaneous curvature tends to decrease, it is controlled to reduce the speed. Accordingly, it is possible to accomplish the harmony between the driver and the system with a high level.

The guideline of controlling to reduce the speed when the instantaneous curvature tends to increase and to increase the speed when the instantaneous curvature tends to decrease is expected to meet a passenger's feeling (not yet the driver) even when it is used to control the speed of a complete automatic driving vehicle. Accordingly, even when the vehicle adds a steering input independent of the driver by the use of an automatic steering device, the control guideline according to the invention is applicable.

According to the invention, since the knowledge on the instantaneous curvature acquired from the driver's voluntary driving operation and the speed adjustment accompanied therewith is taken as the guideline of the speed control and the countermeasure of reducing the interference with the driver and the unpleasant feeling is taken, it is possible to provide a vehicle speed control device meeting a driver's feeling.

Other objects, features and advantages of the invention will become apparent from the following description of the embodiments of the invention taken in conjunction with the accompanying drawings.

DETAILED DESCRIPTION OF THE INVENTION

Figure 4:
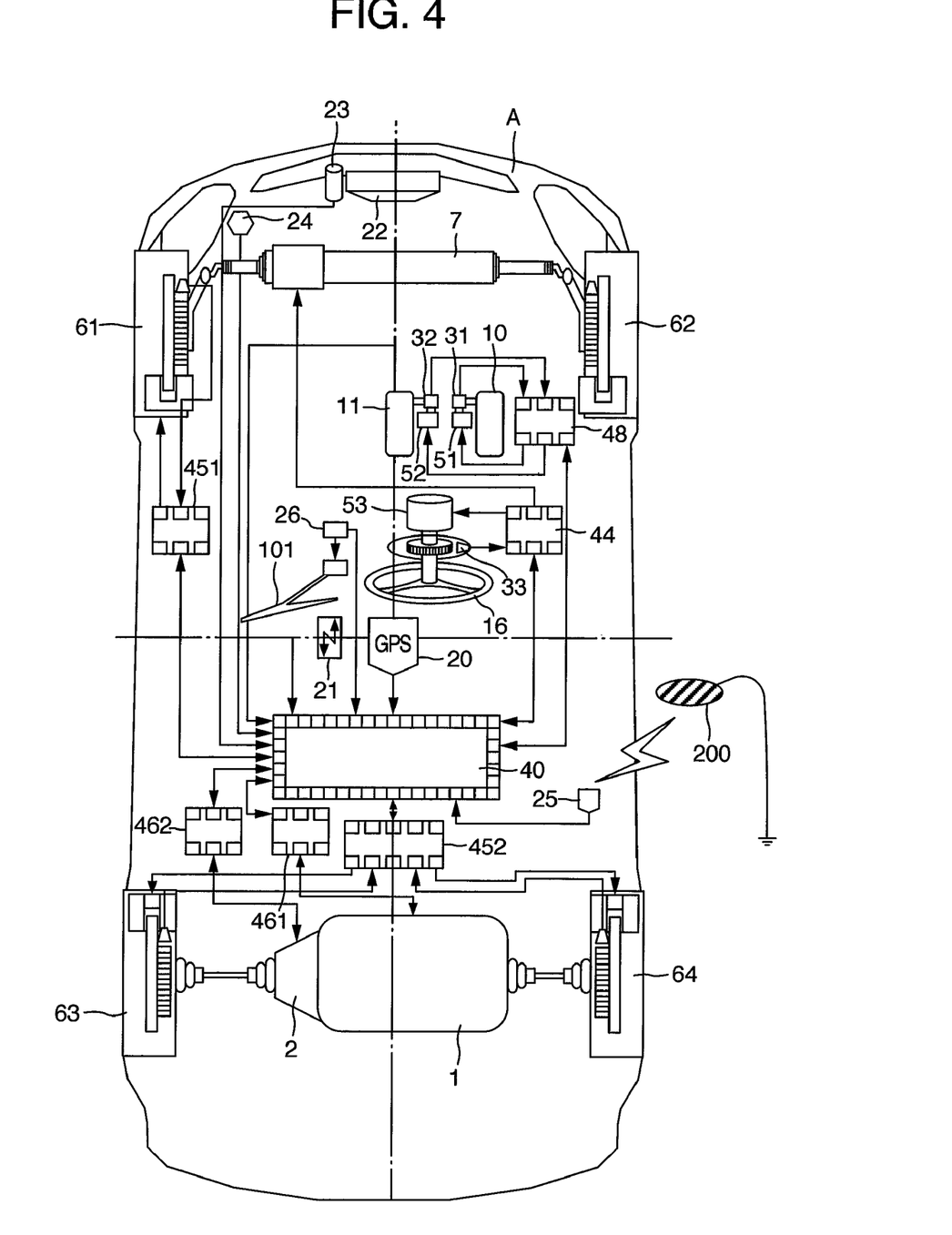
FIG. 4 is a diagram illustrating the entire configuration for implementing an exemplary embodiment according to the invention.

FIG. 4 shows the entire configuration for implementing an exemplary embodiment of the invention.

In this embodiment, vehicle A is constructed in a so-called By-Wire system and no mechanical connection exists between a driver and a steering mechanism, an acceleration mechanism, and a reduction mechanism. An operating amount detecting sensor and a reactive force generating mechanism are disposed in a steering wheel 16, an accelerator pedal 10, and a brake pedal 11 which the driver operates.

<Driving>

Vehicle A is a rear-wheel driving car (Rear Motor Rear Drive: (RR) car) in which a left rear wheel 63 and a right rear wheel 64 are driven by a motor 1. A reduction mechanism 2 decelerating a driving force of the motor is disposed while connecting to the motor 1. Here, the drive wheel method such as front or rear wheel driving and the power source such as an electric motor or an internal combustion engine have no close relation to the invention. So long as a driving power can be applied to the vehicle and the speed can be adjusted to a desired value set by a central controller 40 by adjusting the driving power, it is sufficient.

Now, specific configurations will be described below. A left front wheel 61, a right front wheel 62, a left rear wheel 63, and a right rear wheel 64 are mounted with a brake rotor, a wheel speed detecting rotor, and a wheel speed pickup on the vehicle side, thereby detecting the wheel speed of each of the wheels.

An amount of a driver's pressing an accelerator pedal 10 is detected by an accelerator position sensor 31 and is input to the central controller 40 through a pedal controller 48. An accelerator reactive force motor 51 is connected to the accelerator pedal 10 and the reactive force thereof is controlled by the pedal controller 48 on the basis of a calculation command from the central controller 40. Accordingly, an acceleration command from the driver can be detected and the reactive force for urging the driver to act or to suppress an action can be returned.

A power controller 461 controls the output of the motor 1 in accordance with a command from the central controller 40. The output of the motor 1 drives the left rear wheel 63 and the right rear wheel 64 via the reduction mechanism 2 controlled by a mission controller 462.

<Braking>

The left front wheel 61, the right front wheel 62, the left rear wheel 63, and the right rear wheel 64 are provided with a brake rotor, respectively, and a vehicle body is provided with calipers decelerating the vehicle wheels by interposing the brake rotor between pads (not shown). The calipers are of a hydraulic type or of an electric type in which each caliper has an electric motor.

The calipers are basically controlled by brake controllers 451 (for front wheel) and 452 (for rear wheel) on the basis of a calculation command from the central controller 40. The wheel speeds described above are input to the brake controllers 451 and 452. By averaging the wheel speeds of the front wheels (non-driving wheels) from the four-wheel speeds, it is possible to estimate the absolute vehicle speed. The signals are always monitored as shared information by the central controller 40.

An amount of the driver's pressing the brake pedal 11 is detected by a brake pedal position sensor 32 and is input to the central controller 40 through the pedal controller 48, where the amount is subjected to a calculation process. A pedaling force may be detected instead of the pedal position. A brake reactive force motor 52 is connected to the brake pedal 11 and the reactive force is controlled by the pedal controller 48 on the basis of a calculation command from the central controller 40.

<Steering>

A steering system of vehicle A has a steer by-wire structure having no mechanical connection between a driver steering angle and a tire turning angle. The steering system includes a power steering 7 having a steering sensor (not shown) built therein, a steering wheel 16, a driver steering sensor 33, and a steering controller 44. The steering quantity of the driver steering wheel 16 is detected by the driver steering sensor 33 and is input to the central controller 40 through the steering controller 44, where the steering quantity is subjected to a calculation process. The steering controller 44 controls a front power steering 7 in accordance with a calculation command from the central controller 40.

A steering reactive force motor 53 is connected to the steering wheel 16 and the reactive force is controlled by the steering controller 44 on the basis of the calculation command of the central controller 40.

<Sensor>

A sensor group shown in FIG. 4 will be described now. A GPS (Global Positioning System) sensor 20 can measure an absolute position coordinate of the center of gravity of vehicle A as (x(t), y(t)) in a ground fixed coordinate system (where t is time). The longitudinal acceleration may be obtained by differentiating the vehicle speed acquired from the above-mentioned wheel speeds. However, in this embodiment, a longitudinal acceleration sensor 21 is provided and used for the below-mentioned acceleration and deceleration control. The size of an object in front of the vehicle, the relative speed thereof, and the distance there from can be detected by a millimeter wave radar sensor 22 and a camera 23. Vehicle A is provided with a receiver 25 for acquiring external information such as front information from a beacon 200 which is an infrastructure of a road. In order to automatically actuate a wiper 101, current external information of vehicle A can be acquired by a raindrop sensor 26 detecting rains or an ambient temperature sensor 24.

Vehicle A has the above-mentioned configuration for implementing the exemplary embodiment according to the invention. Hereinafter, a control method, a countermeasure for correction (override) from the driver, a reactive force control method, and a control target switching method based on external information will be described specifically.

<Basic Control Method>

First, as described above, the driver controls the movement of the vehicle on the basis of visual or sensed information. The speed control noted by the invention has high correlation with the instantaneous curvature. The driver controls the speed to be the minimum at the point where the curvature is the maximum.

In a specific control operation, it can be thought that the speed is made to decrease with an increase in curvature, the speed is made to be constant at stable curvature, and the speed is made to increase with a decrease in curvature.

It is not yet discussed whether the driver directly acquires the curvature information (it is not necessary to construct the same mechanism as a human being). From the point of engineering view, the curvature information can be acquired by performing a calculation process on the position information acquired from the GPS signal.

A coordinate at a time t of Expression (3) can be obtained from the GPS.

$$C(t)=C(x(t),y(t)) \quad (3)$$

The curvature is reviewed now. Here, the curvature κ(t) expressed by a general parameter (time t in this time), not by an arc length parameter which indicates a distance along the path, can be obtained as Expression (2), which is described on pages 48 to 51 of "Curve and Curved Surface for deep Learning,—Elementary Differential Geometry—", written by Nobumitsu NAKAUCHI and published by KYORITSU SHUPPAN CO., LTD. (2005).

$$\kappa(t) = \frac{\dot{x}(t)\ddot{y}(t) - \ddot{x}(t)\dot{y}(t)}{(\dot{x}(t)^2 + \dot{y}(t)^2)^{\frac{3}{2}}} \quad (4)$$

The time rate of curvature $\dot{\kappa}$ can be acquired by differentiating Expression (2) with respect to time as described below.

$$\dot{\kappa}(t) = \frac{d}{dt}\kappa(t) \quad (5)$$

Figure 5:
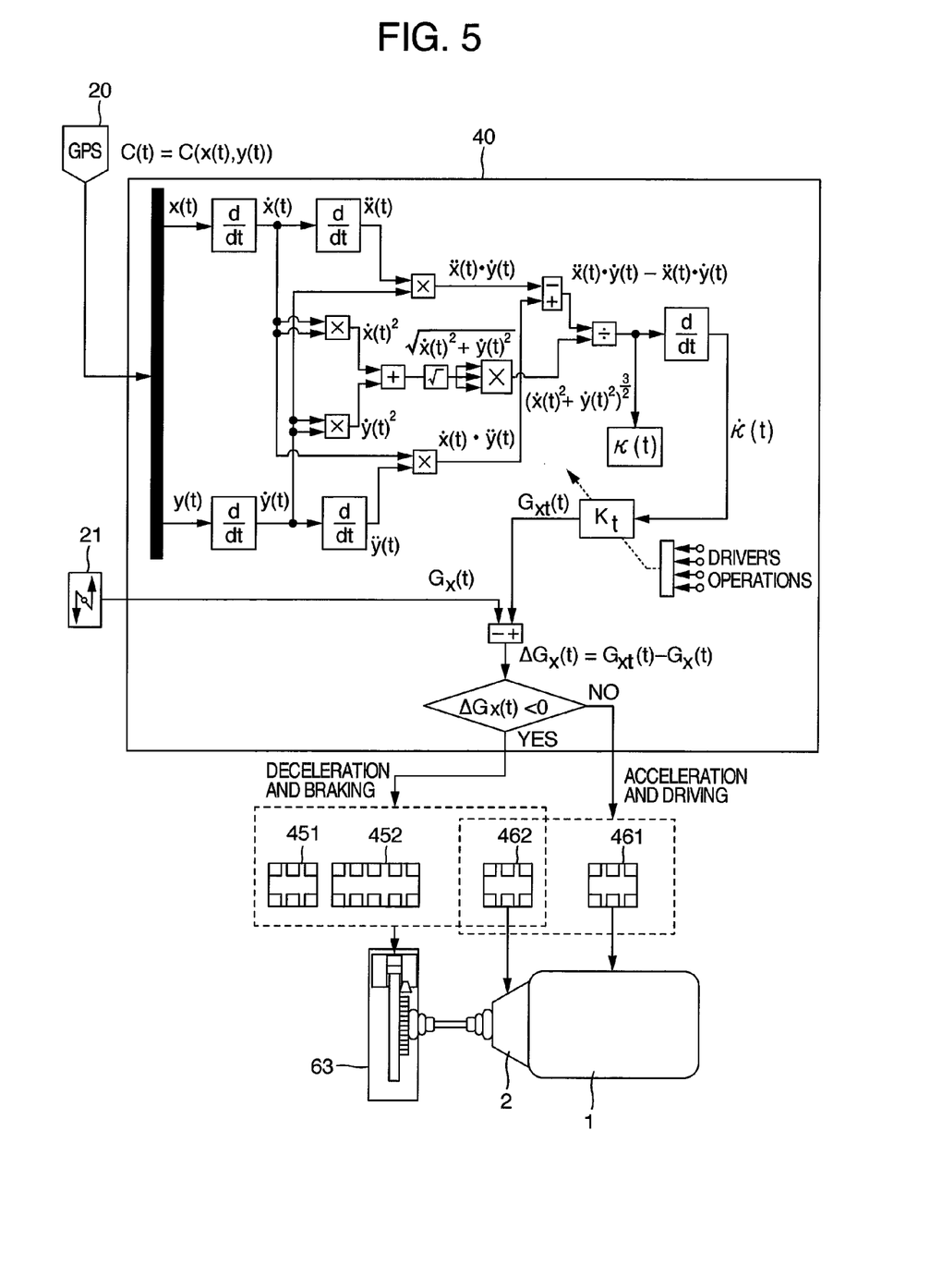
FIG. 5 is a diagram illustrating a basic control method.

These calculations are schematically shown in FIG. 5. FIG. 5 shows an analog calculation process in which it is assumed that the sampling time for data acquisition from the GPS 21. However, a method of quasi differentiating by using a method of calculating a difference of each sampling and the like may be used of course.

When the instantaneous curvature κ(t) (where t=t) and the time variation $\dot{\kappa}(t)$ (time-differentiated value of κ(t)) are obtained, a control method can be considered in which the target longitudinal acceleration of vehicle A is determined from the variation in curvature. That is, when it is assumed that the target longitudinal acceleration is $G_{xt}$ (Gx_target) and $K_t$ represents a proportional gain ($K_t$<0), a value is obtained from the following expression (here, $K_t$ needs be set every speed, but only a specific speed range is considered for the purpose of simplification in this embodiment. As described below, the value may vary at the time of the increase in curvature (deceleration) and at the time of the decrease in curvature (acceleration)).

$$G_{xt}(t)=K_t \cdot \dot{\kappa}(t) \quad (6)$$

In this configuration, at the time of the increase in curvature, that is, when $\dot{\kappa}(t)$ (the time-differentiated value of κ(t)) is positive, the target deceleration is set. At the time of the decrease in curvature, that is, when $\dot{\kappa}(t)$ (the time-differentiated value of κ(t)) is negative, the target acceleration is set. Basically, it is a rough guideline of control that the absolute value of a difference $\Delta G_x(t)$ between this value and the longitudinal acceleration $G_x(t)$ of vehicle A detected by the longitudinal acceleration sensor 21, which is calculated by Expression (7) is made to decrease.

$$\Delta G_{xt}(t)=G_{xt}(t)-G_x(t) \quad (7)$$

However, when $\Delta G_x(t)$ is negative, the deceleration and braking is necessary. When $\Delta G_x(t)$ is positive, the acceleration and driving torque is necessary. As shown in FIG. 5, both calculations are performed by the central controller 40. When the deceleration and braking is necessary, the reduction ratio of the reduction mechanism 2 is first adjusted by the mission controller 462 and the power supply to the motor is limited by the power controller 461, thereby performing a regenerative braking operation by the use of the motor 1. In some states of the vehicle, when the absolute value of Expression (5) cannot be reduced by only the regenerative braking operation, the brake controllers 451 (for front wheel) and 452 (for rear wheel) are actuated to decelerate vehicle A by the use of the brake.

On the other hand, when the acceleration and driving torque is necessary, the reduction ratio of the reduction mechanism 2 is adjusted by the mission controller 462 and the power supply to the motor is made to increase by the power controller 461, thereby performing the acceleration and driving torque by the use of the motor 1.

Figure 6:
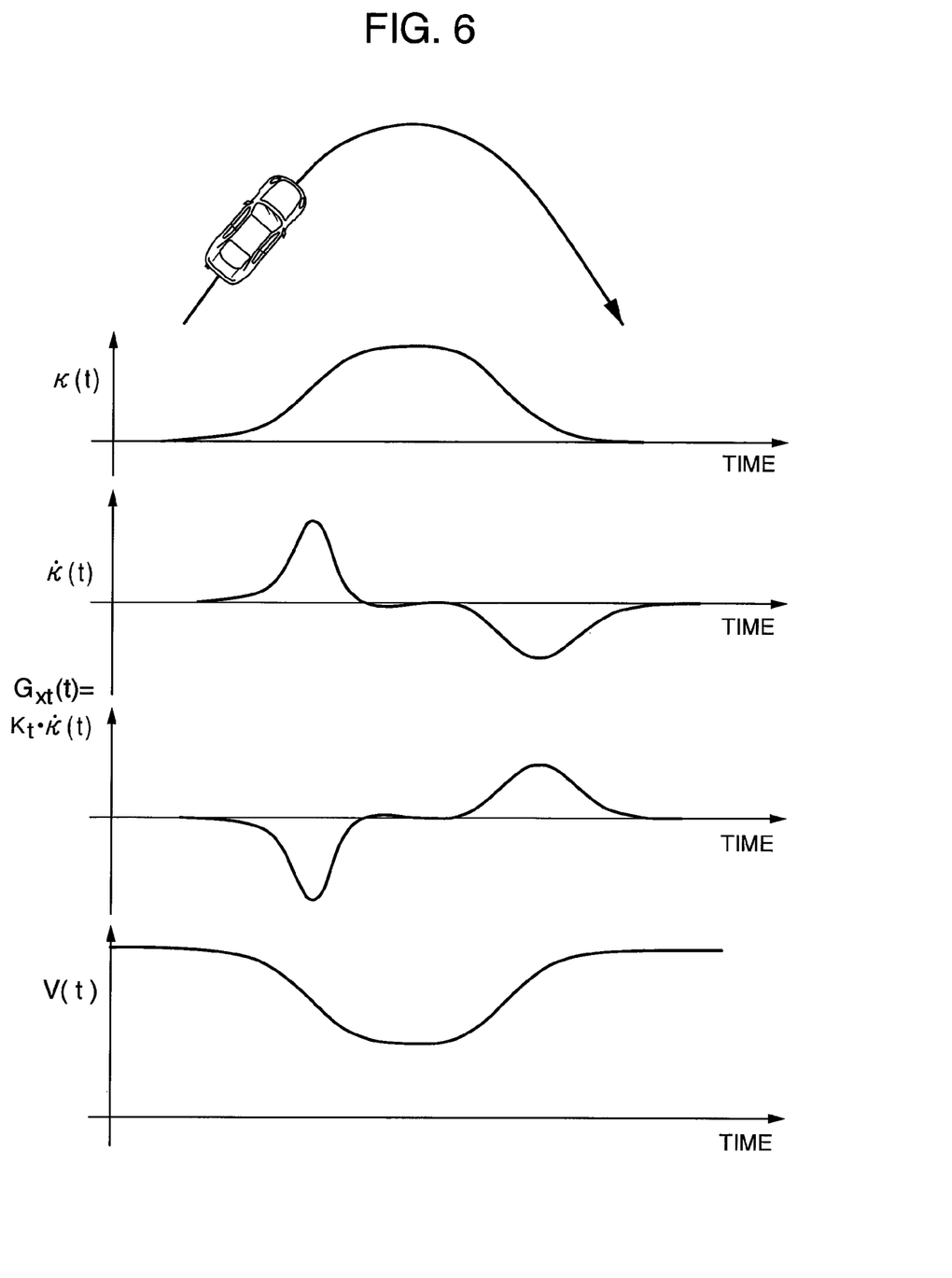
FIG. 6 is a conceptual diagram illustrating the traveling state when the control has been performed.

FIG. 6 is a conceptual diagram schematically illustrating a running state when the control has been accomplished, that is, when the absolute value of Expression (5) could be made to be sufficiently small. By performing the control operation shown in FIG. 5 with the configuration shown in FIG. 4, it is possible to control to reduce the speed when the instantaneous curvature tends to increase and to enhance the speed when the instantaneous curvature tends to decrease.

The central controller 40 performs the acceleration and deceleration control operation and controls the pedal controller 48 to accomplish the pedal stroke for realizing the acceleration and deceleration.

In a state where the driver comes in contact with the pedal, it is necessary to perform the reactive force control operation. When a threshold value is set and the driver applies a pedaling force greater than the threshold value, it is received as an override command described later. However, when the pedaling force is equal to or smaller than the threshold value, the reactive force is controlled to maintain the above-mentioned stroke. At this time, a method of adding a virtual spring element and the like so as for the driver not to feel like the fixed pedal and the like may be realized. Ideally, only the force due to placing a foot on the pedal is supported. The pedal control operation is performed to concurrently provide the driver with a feeling of the acceleration or deceleration and a feeling that no force is given to the foot but the pedal is actuated to actuate the system.

By performing the above-mentioned control operation, it is possible to provide a vehicle speed control device meeting the driver's feeling. Although not described in detail, the longitudinal acceleration sensor 21 detects the instantaneous longitudinal acceleration of vehicle A and feeds back the detected acceleration, thereby preventing the control operation from severely failing even if running on the up and down road.

<Countermeasure for Override>

Figure 7:
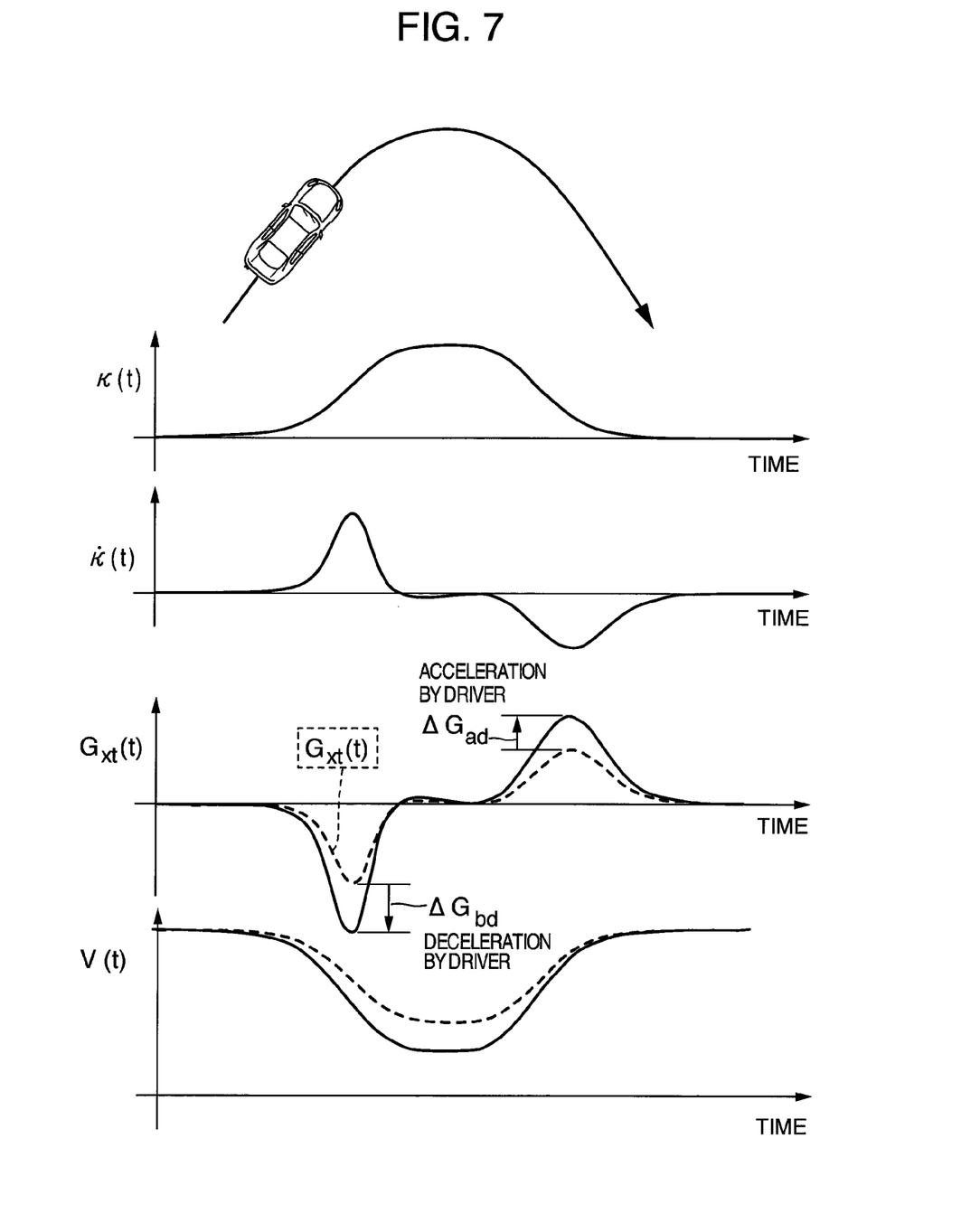
FIG. 7 is a diagram illustrating a driving state when a driver has overridden the control.

It is considered now that the driver overrides the brake or the accelerator over the system. FIG. 7 is a diagram illustrating a driving state when the driver overrides both the brake and the accelerator. As described later, the control operation is configured to stop in the state where the driver's input is overridden.

On the other hand, since the GPS information is put even at the time of stopping the control operation, the target longitudinal acceleration $G_{xt}$ can be calculated by Expression (4) (although the control operation is not performed) (FIG. 7). Since the longitudinal acceleration generated in vehicle A by the driver's operation can be measured by the longitudinal acceleration sensor 21, for example, the difference $\Delta G_{bd}$ between the actual longitudinal acceleration and the target longitudinal acceleration $G_{xt}$ at the point where the deceleration is the maximum or the difference $\Delta G_{ad}$ between the actual longitudinal acceleration and the target longitudinal acceleration $G_{xt}$ at the point where the acceleration is the maximum can be calculated.

The reason for the driver operating the brake in spite of the deceleration command from the system is that the deceleration gain of the control system is not sufficient for realizing the driver's ideal motion. When the driver enhances an opening degree of the accelerator to accelerate the vehicle in spite of the deceleration command calculated from the system, it means that the deceleration gain of the driver's ideal movement is too big.

When the system gives the acceleration command, the reason for the driver's operation is similar. Accordingly, in order to provide a vehicle speed control system meeting the driver's feeling as the object of the invention, it is necessary to adjust the proportional gain $K_t$ for determining the target longitudinal acceleration $G_{xt}$. Since the deceleration gain and the acceleration gain cannot be compensated for in the same way, it is necessary to individually adjust the gains.

Figure 8:
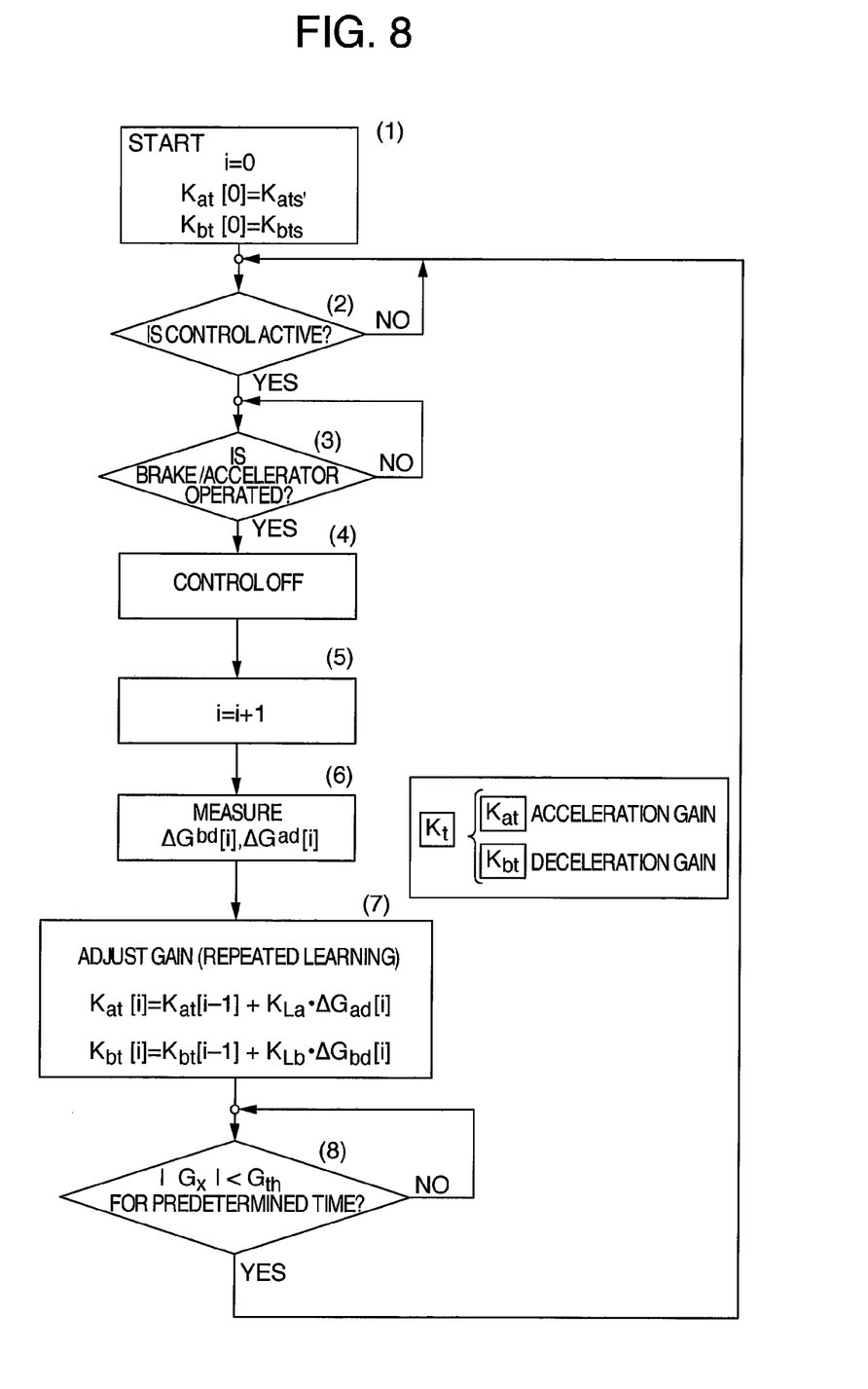
FIG. 8 is a flowchart illustrating a control switching and gain updating procedure.

FIG. 8 is a flowchart illustrating a control switching and gain updating procedure at the time of the driver's overriding.

Here, it is assumed that the acceleration gain is $K_{at}$, the deceleration gain is $K_{bt}$, and the number of overriding events is i (where i is an integer). The gain updating process employs a repeated learning based on "Vehicle Idling Vibration Reduction Using Electric Machine Active Torque Control (1$^{st}$ Report)", written by Kadomukai and 4 others, Transactions of the Japan Society of Mechanical Engineering, 59-560, C (1993), 1023.

(1) First, set $K_{ats}$ and $K_{bts}$ as initial values $K_{at}[0]$ and $K_{bt}[0]$ of the acceleration gain and the deceleration gain, respectively.

(2) Judge whether the control is active. If the control is active, go to step (3).

(3) Judge whether the brake/accelerator is overridden (it is determined that it is overridden when the pedaling force is equal to or greater than the above-mentioned threshold value). Go to step (4).

(4) Turn OFF the speed (acceleration) control and go to step (5).

(5) Increase the counter (i) by 1 and go to step (6).

(6) Calculate $\Delta G_{bd}$ and $\Delta G_{ad}$ and set them as $\Delta G_{bd}[i]$ and $\Delta G_{ad}[i]$, respectively. Go to step (7).

(7) Adjust the acceleration gain $K_{at}$ and the deceleration gain $K_{bt}$ on the basis of Expressions (8) and (9).

$$K_{at}[i]=K_{at}[i-1]+K_{La}\cdot \Delta G_{ad[i]} \qquad (8)$$

$$K_{bt}[i]=K_{bt}[i-1]+K_{Lb}\cdot \Delta G_{bd[i]} \qquad (9)$$

Here, $K_{at}[i-1]$ and $K_{bt}[i-1]$ are values adjusted in the event cycle (i−1) of the previous overriding ($K_{at}[0]$ and $K_{bt}[0]$ at the first time). By adding values, which are obtained by multiplying the difference between the actual longitudinal acceleration and the target longitudinal acceleration $G_{xt}$ at the present time by learning gains ($K_{La}$ and $K_{Lb}$), to the above-mentioned values, new acceleration gain and deceleration gain $K_{at}[i]$ and $K_{bt}[i]$ are obtained. These values are employed as $K_t$ of Expression (4) or FIG. 5 by the central controller 40, so long as the driver's overriding does not occur again. By enhancing the learning gains, the learning speed can be made to increase, but it may be unstable. The driver's feature needs to be set as values that can be reliably extracted the real number of times.

(8) In this step, in order to judge whether the i-th series of events are ended, determine whether the forward and backward acceleration is smaller than a threshold value $G_{th}$ for a predetermined time. When this condition is satisfied, go back to step (2) to wait for a next event.

As shown in the flowchart of FIG. 8, by stopping the control operation in response to the driver's overriding, the stability can be secured. In addition, by repeatedly learning the difference between the driver's requirement and the system set value so as to approach the driver's requirement, the acceleration and deceleration gains can be adjusted. Accordingly, it is possible to provide a vehicle speed control system meeting the driver's feeling.

<Profile Change of Control Target Acceleration with External Information>

Figure 9:
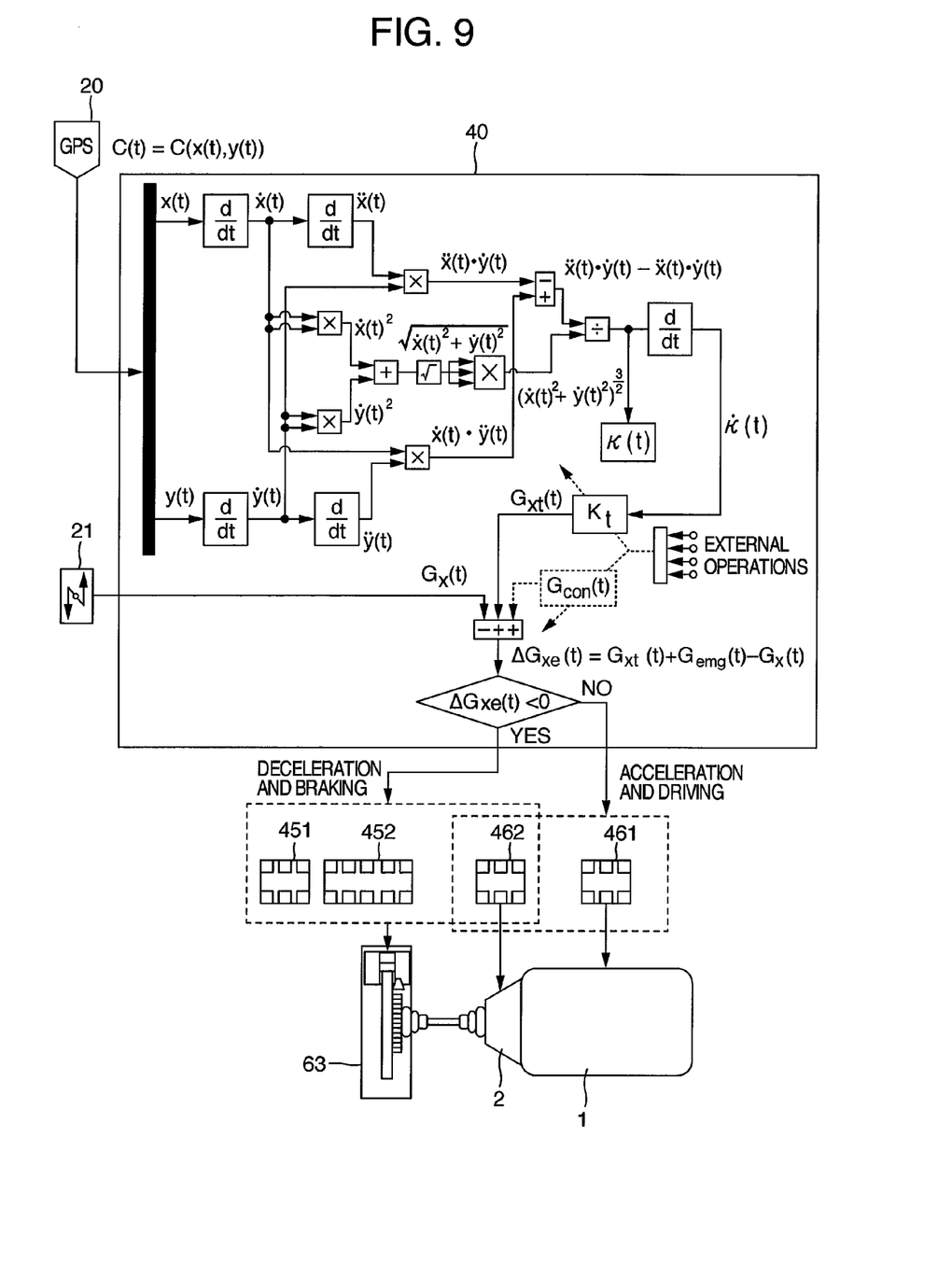
FIG. 9 is a diagram illustrating a control switching and gain updating configuration.

Subsequently, how to change the control target acceleration with external information will be described with reference to FIG. 9.

Techniques of performing a collision avoidance control operation with a front obstacle or a speed control operation of reducing the probability of slip due to a poor road surface state on the basis of information transmitted from an external sensor or an infrastructure disposed on the road are described in detail in JP-A-2004-224093, entitled "Automatic Speed Controller of Vehicle" and JP-A-2004-017731, entitled "Vehicle Traveling Controller, Road Information Providing System, and Vehicle Traveling Control Method."

In the invention, the control method is basically similar to the above-mentioned control methods and a method of implementing the vehicle speed control device in accordance with the curvature of a vehicle trajectory will be described here. Basically, it is necessary to decelerate the vehicle when an obstacle in the front side is detected and to reduce the acceleration and deceleration when the road surface frictional coefficient is low. In the above-mentioned configuration, when the variation in curvature ($\dot{\kappa}$) (differentiated value of $\kappa$) described below does not occur, the target deceleration calculated by Expression (4) becomes zero. Thus, even when an obstacle exists in the front side, the system does not work. At the weather of rains or snows or at a low temperature where the road surface is frozen and slippery, the acceleration or deceleration operation equivalent to that at the clean weather is performed. In this embodiment, the proportional gain $K_t$ ($K_t<0$) in Expression (4) and FIG. 9 is adjusted and $G_{con}$ (G_control) is directly input as a command value independent of it.

Figure 10:
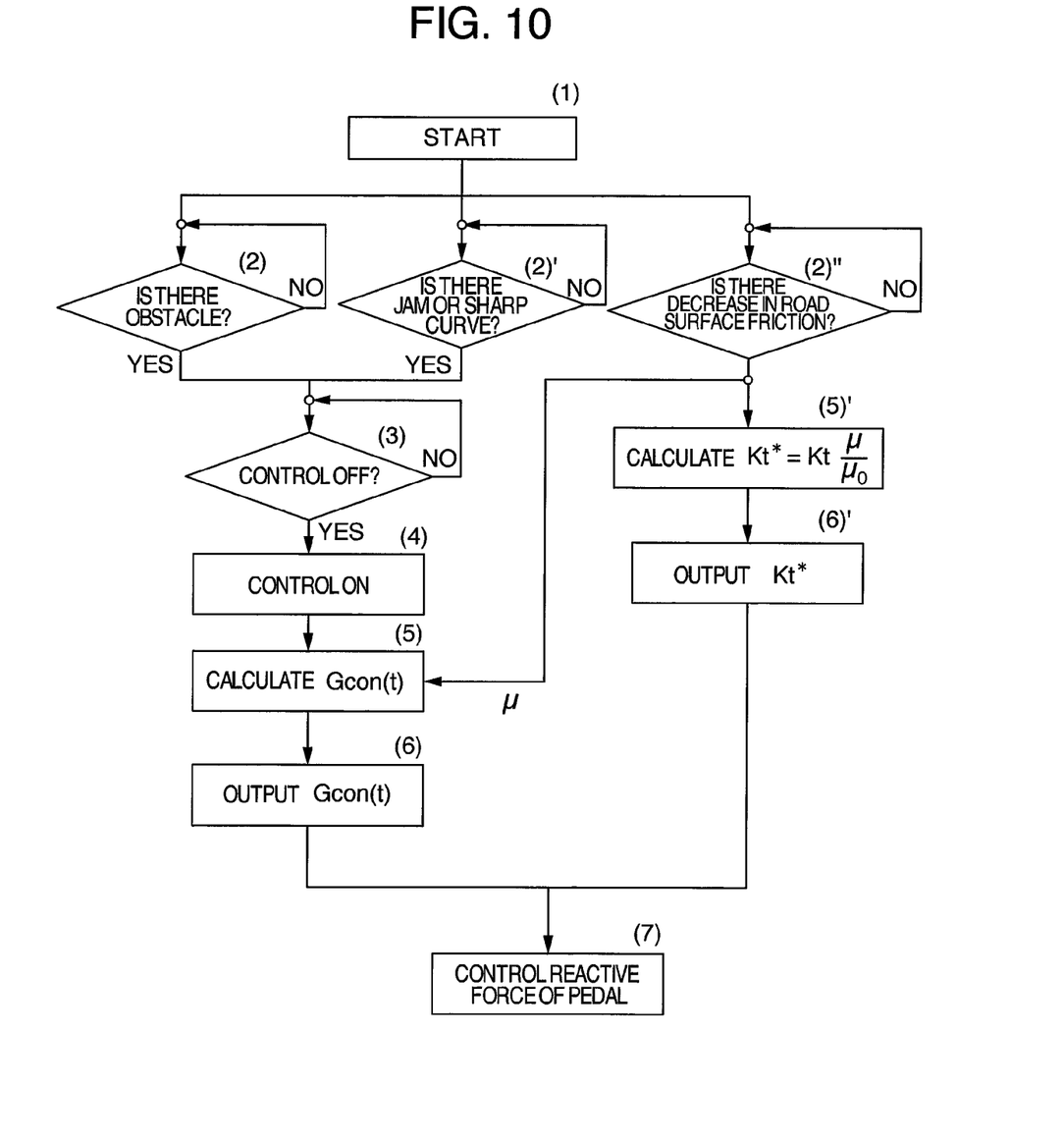
FIG. 10 is a diagram illustrating how to change a control target acceleration with external information.

FIG. 10 is a flowchart illustrating the above-mentioned method. When an obstacle, a variation in road surface state, or the like occurs, it corresponds to the adjustment of $K_t$ and the command of $G_{con}$. Accordingly, these situations are arranged in order to prepare a sheet of drawing. The methods of detecting an obstacle using the millimeter-wave radar sensor 22 and the camera 23, acquiring traffic jam information and the front road shape from navigation map information, which is not mentioned in detail in this specification, and acquiring that the road surface frictional coefficient decreases from $\mu_0$ at the usual dry weather to $\mu$ ($\mu<\mu_0$) by the use of the raindrop sensor 26 detecting rains or the ambient temperature sensor 24 are to be used in the invention, which are described in details in JP-A-2004-224093 and JP-A-2004-017731, and thus description thereof is omitted.

When it is determined in steps (2) and (2)' that an obstacle or a traffic jam or a sharp curve exists in the front, it is checked whether the system is started up to prepare the deceleration in step (3). When the system is not started up, that is, even in a straight road, the system is started up in step (4). The deceleration command $G_{con}(t)$ is calculated using the current position and speed of vehicle A, and the distance to an obstacle (jammed vehicles) or the sharp curve (also the speed of the obstacle when the obstacle moves) in step (5).

At this time, it is preferable that the deceleration command is set within an allowable range of the tire force using the frictional coefficient of the road surface acquired in step (2)'' or that a deceleration command exceeding the allowable range is given to perform an ABS (Antilock Braking System) control operation. Then, as shown in FIG. 9, $G_{con}(t)$ is added to the control command in step (6). Thereafter, it is exhibited that the system is active by setting the reactive force of the accelerator or the brake to vibrate, rebounding the accelerator pedal, or pushing down the brake pedal by the weight of the foot in step (7). This information improves the driver's sense level to allow the driver to recognize that the system is in reasonable operation, thereby reducing the unpleasant feeling.

In step (2)'', the frictional coefficient $\mu$ of the road surface is estimated on the basis of the map information of rain amount and temperature from information on rains, snows, and low temperature or external information. When the frictional coefficient is lower than the frictional coefficient $\mu_0$ of a dry road, the proportional gain $K_t$ ($K_t<0$) in Expression (4) and FIG. 9 is corrected to $\mu/\mu_0$ ($<1$) times in step (5)' and then the corrected gain is output in step (6)'. Accordingly, the rapid acceleration and deceleration is prevented, thereby reducing the variation in behavior of the vehicle. At this time, by transmitting to the driver that $K_t$ is reduced less than that of the usual state and the stroke of the accelerator and the brake is reduced by means of the reactive (stroke) control operation, the driver is allowed to recognize that the system is in reasonable operation, thereby reducing the unpleasant feeling.

<Affinity to Automatic Driving>

Up to now, the method of controlling the speed in accordance with the instantaneous curvature and the variation thereof due to the lateral vehicle movement resulting from the driver's steering has been described. On the contrary, an automatic driving vehicle automatically determines the path on the basis of external information or map information.

The number of paths for movement from a point to another point is infinite, where some paths causes the unpleasant feeling and some paths does not cause the unpleasant feeling. The steering should be performed at a time not causing the unpleasant feeling. Then, the same advantages as the driver's steering operation described above are obtained. In order to realize the steering not causing the unpleasant feeling, when the vehicle speed is constant, the steering speed should be controlled to be constant so as to form a clothoid curve. When the vehicle speed accompanies the deceleration, the timing and the steering angle should can be adjusted, for example, by using the knowledge described in "A New Approach to Understanding Driver Maneuver Characteristics based upon Jerk Information", written by Yamakado and Abe, Preprint by Society of Automobile Engineering of Japan Inc., No. 139-06, pp 23-28 (2006).

1) The timing when the driver starts the steering after deceleration has high correlation with the timing when the longitudinal jerk of the vehicle is zero.

2) The timing when the turning is started and the brake is released after deceleration or the timing when the vehicle is accelerated to the maximum has high correlation with the timing when the lateral jerk of the vehicle is zero.

3) There is a range where the vertical load at the outside of the front wheel increases at a constant rate with respect of time at the time of deceleration and turning.

As described above, according to the invention, even when the vehicle is constructed to apply a steering input independent of the driver by the use of the automatic steering system, it is possible to provide a vehicle speed control system meeting the driver's feeling.

According to the invention, since the knowledge on the instantaneous curvature acquired from a driver's voluntary driving operation and the speed adjustment accompanying therewith are used as a guideline of the speed control and a countermeasure for reducing the interference with the driver and the driver's unpleasant feeling is taken, it is possible to provide a vehicle speed control system fitting the driver's feeling.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle speed control system comprising:
   means for calculating instantaneous curvature; and
   means for controlling a vehicle speed; wherein,
   a vehicle is controlled to reduce the vehicle speed when the instantaneous curvature tends to increase and to enhance the vehicle speed when the instantaneous curvature tends to decrease;

the means for calculating instantaneous curvature includes means for instantaneously detecting a positional coordinate (x(t), y(t)) of the vehicle in a plane defined by at least two axes perpendicular to each other; and the instantaneous curvature (κ(t)) is calculated on the basis of the following expression;

$$\kappa(t) = \frac{\dot{x}(t)\ddot{y}(t) - \ddot{x}(t)\dot{y}(t)}{(\dot{x}(t)^2 + \dot{y}(t)^2)^{\frac{3}{2}}}.$$

2. The vehicle speed control system according to claim 1, further comprising means for calculating a time rate of variation in the instantaneous curvature
wherein the vehicle is controlled to increase an increasing or decreasing rate per unit time of the vehicle speed when the time rate of variation is great, and to reduce the increasing or decreasing rate per unit time of the vehicle speed when the time rate of variation is small.

3. The vehicle speed control system according to claim 1, wherein the means for controlling the vehicle speed comprises all or a part of at least one of a brake, an output adjusting unit of a prime mover, and a transmission attached to the prime mover.

4. The vehicle speed control system according to claim 1 further comprising means for receiving an acceleration/deceleration command input by a driver;
wherein the vehicle speed varies in accordance with the acceleration/deceleration command.

5. The vehicle speed control system according to claim 4, further comprising a mechanism generating a reactive force, or a displacement, or both at an input device to which the driver applies the acceleration/deceleration command;
wherein at least one of the reactive force and the displacement generated by the mechanism, or both is made to vary with a variation in speed.

6. The vehicle speed control system according to claim 4, wherein an increasing or decreasing rate of speed per unit time as a control command is made to vary in accordance with a plurality of acceleration/deceleration commands input by the driver.

7. The vehicle speed control system according to claim 1, further comprising means for estimating a road surface state;
wherein the vehicle is controlled to decrease an average speed and to decrease the increasing rate or the decreasing rate of speed per unit time when a road surface coefficient tends to decrease.

8. The vehicle speed control system according to claim 1, further comprising means for inputting external information;
wherein the vehicle speed is controlled to decrease even when the vehicle recognizes an obstacle in the traveling direction and the instantaneous curvature tends to decrease.

9. The vehicle speed control device according to claim 1.
wherein the vehicle applies a steering input by the use of an automatic steering device, independently or the driver.

* * * * *